Dec. 9, 1952     I. SORS ET AL     2,620,472
SUN SHIELD
Filed Aug. 6, 1949
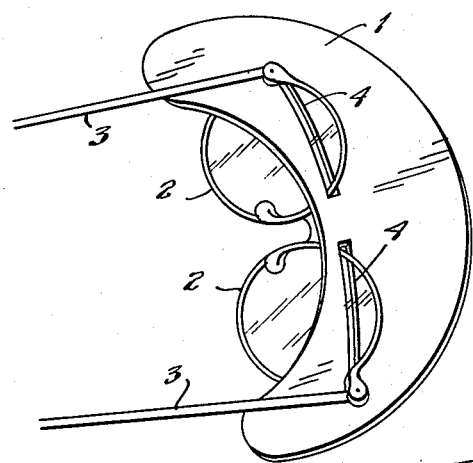
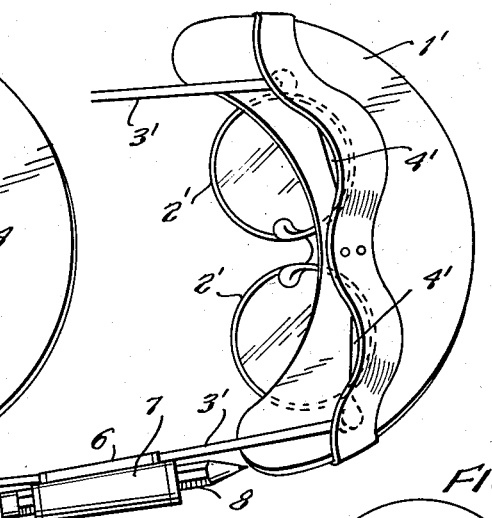
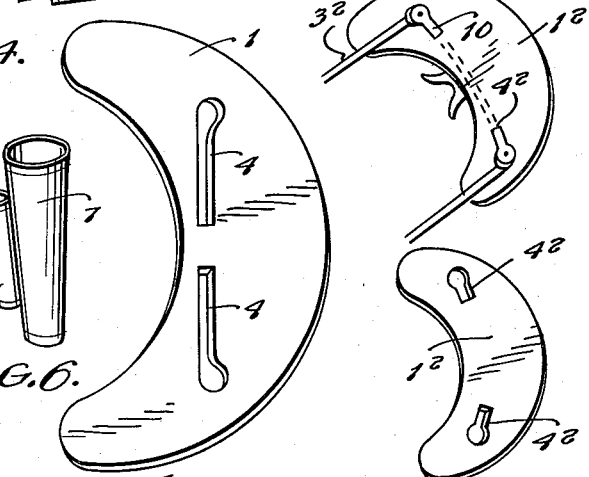
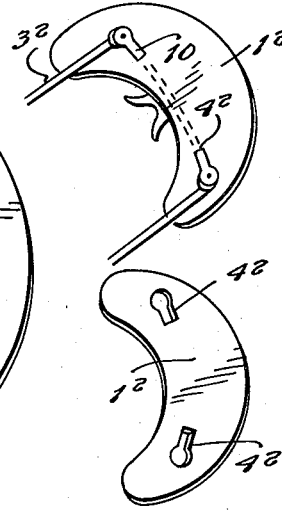
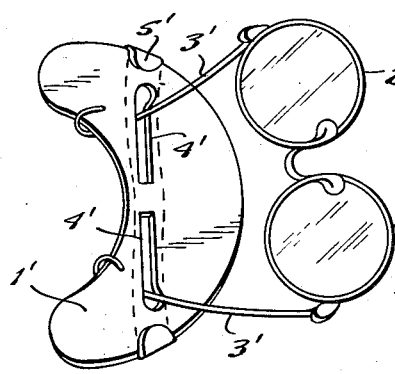
INVENTORS
IVAN SORS,
ALADAR ABRAHAMSON
BY Patented Dec. 9, 1952

2,620,472

UNITED STATES PATENT OFFICE 2,620,472

SUN SHIELD

Ivan Sors and Aladar Abrahamson,
New York, N. Y.

Application August 6, 1949, Serial No. 108,988

2 Claims. (Cl. 2—13)

This invention relates to sun shields and it is one of the objects of the present invention to provide a sun shield which is either made integrally with an eye glass frame or easily mountable on such means.

It is another object of the present invention to provide a sun shield which is equipped with slots which serve as mounting means for the sun shield on an eye glass frame or on a special frame.

It is yet another object of the present invention to provide a sun shield which can be economically manufactured and may be used with or without a special frame.

With these and other objects in view which will become apparent in the following detailed specification, the present invention will be clearly understood in connection with the accompanying drawings in which Figure 1 is a top perspective view of one embodiment of the sun shield mounted on an eye glass frame;

Fig. 2 is a top perspective view of a variation of the embodiment shown in Fig. 1 mounted on an eye glass frame;

Fig. 3 is a plan view of the sun shield shown in Fig. 1;

Fig. 4 is a plan view of the sun shield shown in Fig. 2;

Fig. 5 is a fragmentary plan view of the sun shield shown in Fig. 4 with two sleeves for receiving writing utensils;

Fig. 6 is a top perspective view of the two sleeves shown in Fig. 5, at an enlarged scale;

Fig. 7 is a top perspective view of the sun shield shown in Fig. 1 adapted for use with a special frame;

Fig. 8 is a top plan view of the sun shield; and

Fig. 9 is a bottom perspective view of the sun shield shown in Fig. 2 illustrating the mounting of the shield on an eye glass frame.

Referring now to the drawing and particularly to the embodiment shown in Figs. 1 and 3, the sun shield comprises a flat sheet of preferably substantially crescent shape and made of plastic, cardboard or any other suitable material. No particular additional means for securing the sheet 1 to an eye glass frame 2 having temples 3 are provided. It is rather an essential feature of the present invention to provide merely two slots 4 in the sheet 1 which slots 4 are disposed along one line about perpendicularly to the main axis of the crescent shaped sheet and of a length which is slightly smaller than the diameter of the frame 2 for the lenses. The slots 3 are preferably widened at their outer ends in order to permit of easy insertion of the temples 3 and of the upper portion of the frames 2 for the lenses which extend through the slots 4 and thereby support the sheet 1 in operative position.

A slight variation of the embodiment shown in Fig. 1 is disclosed in Figs. 2 and 4. A shield 1' of substantially crescent shape is again provided which has slots 4' disposed in the same manner, as described in connection with Fig. 1. The upper portion of the frame 2' passes through the slots 4' and, thereby, supports the sheet 1'. The variation, shown in Fig. 2, resides in a cover strip 5 disposed on top of the sheet 1' above the slots 4' and secured to the sheet 1' by stapling or any other suitable means at the center of the sheet 1' and preferably, overlapping the side margin of the sheet 1' and secured thereto. The cover strip 5 is thus close to the sheet 1' at its center and its side margins, while the portions between the center and the side margin are kept in some distance in order to provide sufficient space for the upper portion of the lens frames extending through the slots 4' of the sheet 1'. Thus the cover strip 5 serves the purpose of preventing the light rays or sun rays passing through the slots 4'.

As indicated in Fig. 2 one of the temples 3' may carry a sleeve 6 of about open diameter fitting the diameter of the temples 3', which sleeve 6 supports a second sleeve 7 (Fig. 6) which is adapted to receive any writing utensil, as a pencil 8.

Instead of using the temple 3' as a carrier for the writing utensil holder, the cover strip 5 may be used for this purpose by providing a double sleeve 9 secured to the center of the cover strip 5 (Fig. 5).

While Figs. 1 to 4 disclose the use of the sun shield in accordance with the present invention in connection with an eye glass frame, Figs. 7 and 8 show the use of substantially the same shield in connection with a special frame which comprises a cross bar 10 connecting the temples $3^2$. As indicated, particularly in Fig. 8, the sheet $1^2$ is of substantially crescent shape and has slots $4^2$ which are disposed in a straight line across the sheet $1^2$ when the sheet $1^2$ is in a flat position. The slots $4^2$ are, however, of shorter length as compared with those of the first embodiment.

In order to mount the sun shield on the eye glass frame or on the special frame, the temples 3' are first put through the slots 4' from the bottom face to the top of the shield 1' (see Fig. 9) and then upper portion of the lens frame 3' and cross bar 10, respectively.

While we have disclosed two embodiments of the sun shield, it is to be understood that these embodiments are given by example only and not in any limiting sense, the scope of the present invention being determined by the objects and the claims.

We claim:

1. A sun shield device, to be mounted on an eye glass frame having temples, comprising a longitudinal sheet, the latter having at least one slot disposed in longitudinal direction thereon adapted to receive the eyeglass frame, and a cover strip disposed above said slot on the top face of the said sheet, said strip being secured to the said sheet at least at its side ends and spaced from the sheet in the intermediate portion thereof.

2. A sun shield device, to be mounted on an eyeglass frame having temples, comprising a longitudinal sheet, the latter having two aligned slots disposed in longitudinal direction thereon and adapted to receive the eyeglass frame, and a cover strip disposed above each of said slots above the top face of the sheet and secured to the latter adjacent the ends of said slots and spaced apart from the sheet in the intermediate portions.

IVAN SORS.
ALADAR ABRAHAMSON.

REFERENCES CITED

The following references are of record in the file of this patent:

UNITED STATES PATENTS

| Number | Name | Date |
|---|---|---|
| 1,834,415 | O'Meara | Dec. 1, 1931 |
| 1,884,047 | McClellan | Oct. 25, 1932 |
| 2,093,536 | Alvord | Sept. 21, 1937 |
| 2,253,101 | Thoreson | Aug. 19, 1941 |

FOREIGN PATENTS

| Number | Country | Date |
|---|---|---|
| 398,881 | Great Britain | Sept. 25, 1933 |